United States Patent
Bercovici

(10) Patent No.: US 10,452,667 B2
(45) Date of Patent: Oct. 22, 2019

(54) IDENTIFICATION OF PEOPLE AS SEARCH RESULTS FROM KEY-WORD BASED SEARCHES OF CONTENT IN A CLOUD-BASED ENVIRONMENT

(71) Applicant: Box, Inc., Los Altos, CA (US)

(72) Inventor: Tamar Bercovici, Los Altos, CA (US)

(73) Assignee: Box Inc., Redwood City, CA (US)

( * ) Notice: Subject to any disclaimer, the term of this patent is extended or adjusted under 35 U.S.C. 154(b) by 383 days.

(21) Appl. No.: 13/937,101

(22) Filed: Jul. 8, 2013

(65) Prior Publication Data

US 2014/0012836 A1    Jan. 9, 2014

Related U.S. Application Data

(60) Provisional application No. 61/668,698, filed on Jul. 6, 2012.

(51) Int. Cl.
*G06F 16/248* (2019.01)
*G06Q 10/10* (2012.01)

(52) U.S. Cl.
CPC ......... *G06F 16/248* (2019.01); *G06Q 10/101* (2013.01)

(58) Field of Classification Search
CPC ................................................ G06F 16/248
See application file for complete search history.

(56) References Cited

U.S. PATENT DOCUMENTS

| | | |
|---|---|---|
| 858,619 A | 7/1907 | O'Farrell |
| 5,043,876 A | 8/1991 | Terry |
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

Extended Search Report for EP131832800, Applicant: Box, Inc, dated Aug. 25, 2014, 7 pages.

(Continued)

*Primary Examiner* — Van H Oberly
(74) *Attorney, Agent, or Firm* — Sheridan Ross P.C.

(57) ABSTRACT

Systems and methods are disclosed for identifying users of a collaboration system as search results. In one embodiment, the system performs a text-based content search of content items to identify relevant content. The disclosed system stores metadata associated with the content that includes various user information. The user information can be used to facilitate identification of relevant individuals (users or collaborators) as search results, in addition to or in lieu of, relevant content.

23 Claims, 9 Drawing Sheets

Content Item Metadata Table — 600

| Content Item ID | Content Item Type | Collaborator Information |
|---|---|---|
| ⋮ | | |
| #57 | Text Document | User B – Upload (Owner)<br>User A – Edit<br>User C – Read<br>User D – Read |
| #58 | Spreadsheet | User B – Upload (Owner)<br>User B – Edit<br>User B – Edit<br>User A – Read |
| ⋮ | | |

(56) References Cited

U.S. PATENT DOCUMENTS

| | | |
|---|---|---|
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,745,267 B2 | 6/2014 | Luecke et al. |
| 8,782,637 B2 | 7/2014 | Khalid |
| 8,825,597 B1 | 9/2014 | Houston et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 | 2/2015 | Barton et al. |
| 8,966,062 B1 | 2/2015 | Giese et al. |
| 8,990,955 B2 | 3/2015 | Hymel et al. |
| 9,495,364 B2 | 11/2016 | Savage et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0043191 A1 | 3/2003 | Tinsley et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0006576 A1 | 1/2004 | Colbath et al. |
| 2004/0021686 A1 | 2/2004 | Barberis |
| 2004/0021765 A1 | 2/2004 | Kubala et al. |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0152055 A1 | 8/2004 | Gliessner et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |

(56) References Cited

U.S. PATENT DOCUMENTS

| | | |
|---|---|---|
| 2005/0028006 A1 | 2/2005 | Leser et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0089857 A1 | 4/2006 | Zimmerman et al. |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0052358 A1* | 2/2008 | Beaven ............ G06Q 10/0633 709/205 |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0089665 A1 | 4/2008 | Thambiratnam et al. |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0270110 A1 | 10/2008 | Yurick et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0063995 A1 | 3/2009 | Baron et al. |
| 2009/0119169 A1 | 5/2009 | Chandratillake et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0259526 A1* | 10/2009 | Bechtel ............... G06Q 10/10 705/7.32 |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0005087 A1* | 1/2010 | Basco ............ G06F 17/30864 707/E17.017 |
| 2010/0011292 A1 | 1/2010 | Marinkovich et al. |
| 2010/0011447 A1 | 1/2010 | Jothimani |
| 2010/0017262 A1 | 1/2010 | Iyer et al. |

(56) References Cited

U.S. PATENT DOCUMENTS

| | | |
|---|---|---|
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0146009 A1 | 6/2010 | Kandekar et al. |
| 2010/0151431 A1 | 6/2010 | Miller |
| 2010/0153835 A1 | 6/2010 | Xiong et al. |
| 2010/0162135 A1* | 6/2010 | Wanas ............... G06Q 10/10 715/753 |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0228693 A1 | 9/2010 | Dawson et al. |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0043652 A1 | 2/2011 | King et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066645 A1 | 3/2011 | Cooper et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113011 A1 | 5/2011 | Prorock et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0153330 A1 | 6/2011 | Yazdani et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0212430 A1 | 9/2011 | Smithmier et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252320 A1 | 10/2011 | Arrasvuori et al. |
| 2011/0252339 A1 | 10/2011 | Lemonik et al. |
| 2011/0258200 A1 | 10/2011 | Drummond |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2011/0320423 A1 | 12/2011 | Gemmell et al. |
| 2012/0036370 A1 | 2/2012 | Lim et al. |
| 2012/0056901 A1 | 3/2012 | Sankarasubramaniam et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0078626 A1 | 3/2012 | Tsai et al. |
| 2012/0078691 A1 | 3/2012 | Tsai et al. |
| 2012/0079095 A1 | 3/2012 | Evans et al. |
| 2012/0089659 A1 | 4/2012 | Halevi et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0131009 A1 | 5/2012 | Nath et al. |
| 2012/0134491 A1 | 5/2012 | Liu |
| 2012/0136936 A1 | 5/2012 | Quintuna |
| 2012/0143605 A1 | 6/2012 | Thorsen et al. |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0159341 A1 | 6/2012 | Murillo et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |

(56) References Cited

U.S. PATENT DOCUMENTS

| | | |
|---|---|---|
| 2012/0173626 A1 | 7/2012 | Reis et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0278388 A1 | 11/2012 | Kleinbart et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0290591 A1 | 11/2012 | Flynn et al. |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0067333 A1 | 3/2013 | Brenneman |
| 2013/0073403 A1 | 3/2013 | Tuchman et al. |
| 2013/0080919 A1 | 3/2013 | Kiang et al. |
| 2013/0110565 A1 | 5/2013 | Means, Jr. et al. |
| 2013/0110804 A1 | 5/2013 | Davis et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0151611 A1 | 6/2013 | Graham et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0232149 A1 | 9/2013 | Smith et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268490 A1 | 10/2013 | Keebler et al. |
| 2013/0268491 A1 | 10/2013 | Chung et al. |
| 2013/0275398 A1 | 10/2013 | Dorman et al. |
| 2013/0275413 A1* | 10/2013 | Snir .............. G06F 17/30554 707/722 |
| 2013/0275429 A1 | 10/2013 | York et al. |
| 2013/0275509 A1 | 10/2013 | Micucci et al. |
| 2013/0282813 A1 | 10/2013 | Lessin et al. |
| 2013/0282830 A1 | 10/2013 | Besen et al. |
| 2013/0304774 A1* | 11/2013 | Tan .............. G06F 17/30082 707/827 |
| 2013/0305039 A1 | 11/2013 | Gauda |
| 2013/0326344 A1 | 12/2013 | Masselle et al. |
| 2014/0007205 A1 | 1/2014 | Oikonomou |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0039887 A1 | 2/2014 | Dzik et al. |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082091 A1 | 3/2014 | Rexer |
| 2014/0101094 A1 | 4/2014 | Savage et al. |
| 2014/0115099 A1 | 4/2014 | Kabir |
| 2014/0150023 A1 | 5/2014 | Gudorf et al. |
| 2014/0156373 A1 | 6/2014 | Roberts et al. |
| 2014/0164382 A1 | 6/2014 | Keebler |
| 2014/0172595 A1 | 6/2014 | Beddow et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113572 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |

(56) References Cited

FOREIGN PATENT DOCUMENTS

| WO | WO-2013013217 A1 | 1/2013 |
|----|------------------|--------|
| WO | WO-2013041763 A1 | 3/2013 |
| WO | WO-2013166520    | 11/2013 |

OTHER PUBLICATIONS

Extended Search Report for EP141509422, Applicant: Box, Inc, dated Aug. 26, 2014, 12pages.
Search Report for EP 13189144.2 Applicant: Box, Inc, dated Sep. 1, 2014, 9 pages.
Exam Report for GB1312874.9 Applicant: Box, Inc, dated Sep. 26, 2014, 2 pages.
Exam Report for GB1415126.0 Applicant: Box, Inc, dated Oct. 2, 2014, 8 pages.
Exam Report for GB1415314.2 Applicant: Box, Inc, dated Oct. 7, 2014, 6 pages.
Exam Report for GB1309209.3 Applicant: Box, Inc, dated Oct. 7, 2014, 3 pages.
Exam Report for GB1315232.7 Applicant: Box, Inc, dated Oct. 9, 2014, 5 pages.
Exam Report for GB1318789.3 Applicant: Box, Inc, dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc, dated Nov. 7, 2014, 6 pages.
Exam Report for GB1311417.8 Applicant: Box, Inc, dated Nov. 7, 2014, 2 pages.
Exam Report for GB1311421.0 Applicant: Box, Inc, dated Nov. 7, 2014, 4 pages.
Exam Report for GB1316682.2 Applicant: Box, Inc, dated Nov. 19, 2014, 6 pages.
Exam Report for GB1312095.1 Applicant: Box, Inc, dated Nov. 19, 2014, 5 pages.
Exam Report for GB1313559.5 Applicant: Box, Inc, dated Nov. 4, 2014, 2 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc, dated Nov. 21, 2013, 7 pages.
Exam Report for GB1309209.3, Applicant: Box, Inc, dated Oct. 30, 2013, 11 pages.
Exam Report for GB1311417.8, Applicant: Box, Inc, dated Dec. 20, 2013, 5 pages.
Exam Report for GB1312095.1, Applicant: Box, Inc, dated Dec. 12, 2013, 7 pages.
Exam Report for GB1312874.9, Applicant: Box, Inc, dated Dec. 20, 2013, 11 pages.
Exam Report for GB1316532.9, Applicant: Box, Inc, dated Oct. 31, 2013, 10 pages.
Exam Report for GB1316533.7, Applicant: Box, Inc, dated Oct. 8, 2013, 9 pages.
Exam Report for GB1316971.9, Applicant: Box, Inc, dated Nov. 26, 2013, 10 pages.
Exam Report for GB1317600.3, Applicant: Box, Inc, dated Nov. 21, 2013, 8 pages.
Exam Report for GB1318373.6, Applicant: Box, Inc, dated Dec. 17, 2013, 4 pages.
Exam Report for GB1320902.8, Applicant: Box, Inc, dated Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
Patent Court Document of Approved Judgment for GB0602349.3 and GB0623571.7; Mar. 3, 2009, 17 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc, dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc, dated Feb. 17, 2015, 6 pages.
Exam Report for GB1312264.3 Applicant: Box, Inc, dated Jan. 30, 2015, 5 pages.
Exam Report for GB1312874.9 Applicant: Box, Inc, dated Feb. 10, 2015, 7 pages.
Exam Report for GB1316685.5 Applicant: Box, Inc, dated Feb. 17, 2015, 5 pages.
Exam Report for EP 13185269.1, Applicant: Box, Inc, dated Feb. 13, 2015, 8 pages.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for EP13185269.1, Applicant: Box, Inc, dated Jan. 28, 7 pages.
Exam Report for GB1308842.2, Applicant: Box, Inc, dated Mar. 10, 2014, 4 pages.
Exam Report for GB1312264.3, Applicant: Box, Inc, dated Mar. 24, 2014, 7 pages.
Exam Report for GB1314771.5, Applicant: Box, Inc, dated Feb. 17, 2014, 7 pages.
International Search Report and Written Opinion for PCT/US2013/034765, Applicant: Box, Inc., dated Jan. 20, 2014, 15 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc, dated Feb. 7, 2014, 9 pages.
Search Report for EP14151588.2, Applicant: Box, Inc, dated Apr. 15, 2014, 12 pages.
Search Report for EP14153783.7, Applicant: Box, Inc, dated Mar. 24, 2014, 7 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the Internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc, dated May 26, 2014, 6 pages.

(56) References Cited

OTHER PUBLICATIONS

Exam Report for GB1318792.7, Applicant: Box, Inc, dated May 22, 2014, 2 pages.
Partial Search Report for EP131832800, Applicant: Box, Inc, dated May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc, dated Apr. 15, 2014, 12 pages.
Search Report for EP141509422, Applicant: Box, Inc, dated May 8, 2014, 7 pages.
Sommerer, "Presentable Document Format: Improved On-demand PDF to HTML Conversion," retrieved from the internet, http://research.microsoft.com, Nov. 2004, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc, dated Jun. 4, 2013, 8 pages.
Exam Report for GB1300188.8, Applicant: Box, Inc, dated May 31, 2013, 8 pages.
Exam Report for GB1306011.6, Applicant: Box, Inc, dated Apr. 18, 2013, 8 pages.
International Search Report and Written Opinion for PCT/US2008/012973 dated Apr. 30, 2009, pp. 1-11.
International Search Report and Written Opinion for PCT/US2010/070366, Applicant: Box, Inc., dated Mar. 24, 2013, 10 pages.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/035404, Applicant: Box, Inc., dated Jun. 26, 2013, 13 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
International Search Report and Written Opinion for PCT/US2013/039782, Applicant: Box, Inc., dated Aug. 28, 2013, 15 pages.
Exam Report for GB1310666.1, Applicant: Box, Inc, dated Aug. 30, 2013, 10 pages.
U.S. Appl. No. 13/412,549 (U.S. Pat. No. 8,583,619), filed Mar. 5, 2012 (Nov. 12, 2013) Methods And Systems For Open Source Collaboration In An Application Service Provider Environment.
U.S. Appl. No. 14/073,502, filed Nov. 6, 2013 Methods and Systems for Open Source Collaboration In An Application Service Provider Environment.
U.S. Appl. No. 13/274,268, (U.S. Pat. No. 8,515,902), filed Oct. 14, 2011 (Aug. 20, 2013) Automatic And Semi-Automatic Tagging Features Of Work Items In A Shared Workspace For Metadata Tracking In A Cloud-Based Content Management System With Selective Or Optional User Contribution.
U.S. Appl. No. 13/526,437, filed Jun. 18, 2012 Managing Updates At Clients Used by a User to Access a Cloud-Based Collaboration Service.
U.S. Appl. No. 13/649,784 (U.S. Pat. No. 8,179,445), filed Oct. 11, 2012 (May 6, 2014) Highly Available Ftp Servers For A Cloud-Based Service.
U.S. Appl. No. 13/969,474 (U.S. Pat. No. 8,745,267), filed Aug. 16, 2013 (Jun. 3, 2014) Client-Server Fast Upload And Download Feedback Optimizers.
U.S. Appl. No. 14/293,685, filed Jun. 2, 2014 Enhancement Of Upload And/Or Download Performance Based On Client And/ Or Server Feedback Information.
U.S. Appl. No. 61/751,578, filed Jan. 11, 2013 Functionalities, Features, And User Interface Of A Synchronization Client To A Cloud-Based Environment.
U.S. Appl. No. 14/153,726, filed Jan. 13, 2014 Functionalities, Features, And User Interface Of A Synchronization Client To A Cloud-Based Environment.
U.S. Appl. No. 61/715,208, filed Oct. 17, 2012 Adaptive Architectures For Encryption Key Management In A Cloud-Based Environment.
U.S. Appl. No. 14/056,899, filed Oct. 17, 2013 Remote Key Management In A Cloud-Based Environment.
U.S. Appl. No. 61/709,086, filed Oct. 2, 2012 Visibility, Access Control, Advanced Reporting Api, And Enhanced Data Protection And Security Mechanisms For Administrators In An Enterprise.

(56) References Cited

OTHER PUBLICATIONS

U.S. Appl. No. 14/044,261, filed Oct. 2, 2013 System And Method For Enhanced Security And Management Mechanisms For Enterprise Administrators In A Cloud-Based Environment.
U.S. Appl. No. 61/709,653, filed Oct. 4, 2012 Corporate User Discovery And Identification Of Recommended Collaborators In A Cloud Platform.
U.S. Appl. No. 61/709,407, filed Oct. 4, 2012 Seamless Access, Editing, And Creation Of Files In A Web Interface Or Mobile Interface To A Cloud Platform.
U.S. Appl. No. 14/046,726, filed Oct. 4, 2013 Seamless Access, Editing, And Creation Of Files In A Web Interface Or Mobile Interface To A Collaborative Cloud Platform.
U.S. Appl. No. 61/710,182, filed Oct. 5, 2012 Embedded Html Folder Widget For Accessing A Cloud Collaboration Platform And Content From Any Site.
U.S. Appl. No. 14/047,223, filed Oct. 7, 2013 System And Method For Generating Embeddable Widgets Which Enable Access To A Cloud-Based Collaboration Platform.
U.S. Appl. No. 61/750,474, filed Jan. 9, 2013 File System Event Monitor And Event Filter Pipeline For A Cloud-Based Platform.
U.S. Appl. No. 14/149,586, filed Jan. 7, 2014 File System Monitoring In A System Which Incrementally Updates Clients With Events That Occurred In A Cloud-Based Collaboration Platform.
U.S. Appl. No. 61/753,761 Conflict Resolution, Retry Condition Management, And Handling Of Problem Files For The Synchronization Client To A Cloud-Based Platform.
U.S. Appl. No. 14/158,626 Conflict Resolution, Retry Condition Management, And Handling Of Problem Files For The Synchronization Client To A Cloud-Based Platform.
U.S. Appl. No. 61/739,296, filed Dec. 19, 2012 Synchronization Of Read-Only Files/Folders By A Synchronization Client With A Cloud-Based Platform.
U.S. Appl. No. 14/135,311, filed Dec. 19, 2013 Method And Apparatus For Synchronization Of Items With Read-Only Permissions In A Cloud-Based Environment.
U.S. Appl. No. 61/748,399, filed Jan. 2, 2013 Handling Action Log Framework Race Conditions For A Synchronization Client To A Cloud-Based Environment.
U.S. Appl. No. 14/146,658, filed Jan. 2, 2014 Race Condition Handling In A System Which Incrementally Updates Clients With Events That Occurred In A Cloud- Based Collaboration Platform.
U.S. Appl. No. 61/822,170, filed May 10, 2013 Identification And Handling Of Items To Be Ignored For Synchronization With A Cloud-Based Platform By A Synchronization Client.
U.S. Appl. No. 14/275,890, filed May 13, 2014 Identification And Handling Of Items To Be Ignored For Synchronization With A Cloud-Based Platform By A Synchronization Client.
U.S. Appl. No. 61/822,191, filed May 10, 2013 Systems And Methods For Depicting Item Synchronization With A Cloud-Based Platform By A Synchronization Client.
U.S. Appl. No. 14/275,401, filed May 12, 2014 Top Down Delete Or Unsynchronization On Delete Of And Depiction Of Item Synchronization With A Synchronization Client To A Cloud-Based Platform.
U.S. Appl. No. 61/834,756, filed Jun. 13, 2013 Systems And Methods For Event Building, Collapsing, Or Monitoring By A Synchronization Client Of A Cloud-Based Platform.
U.S. Appl. No. 14/304,038, filed Jun. 13, 2014 Systems And Methods For Synchronization Event Building And/Or Collapsing By A Synchronization Component Of A Cloud-Based Platform.
U.S. Appl. No. 61/838,176, filed Jun. 21, 2013 Maintaining And Updating File System Shadows On A Local Device By A Synchronization Client Of A Cloud-Based Platform.
U.S. Appl. No. 14/312,482, filed Jun. 23, 2014 Maintaining And Updating File System Shadows On A Local Device By A Synchronization Client Of A Cloud-Based Platform.
U.S. Appl. No. 61/839,325, filed Jun. 23, 2013 Systems And Methods For Improving Performance Of A Cloud-Based Platform.
U.S. Appl. No. 14/314,887, filed Jun. 25, 2014 Systems And Methods For Managing Upgrades, Migration Of User Data And Improving Performance Of A Cloud-Based Platform.
U.S. Appl. No. 61/839,331, filed Jun. 25, 2013 Systems And Methods For Providing Shell Communication In A Cloud-Based Platform.
U.S. Appl. No. 14/314,677, filed Jun. 25, 2014 Systems And Methods For Providing Shell Communication In A Cloud-Based Platform.
U.S. Appl. No. 61/860,050, filed Jul. 30, 2013 Scalability Improvement In A System Which Incrementally Updates Clients With Events That Occurred In A Cloud-Based Collaboration Platform.
U.S. Appl. No. 14/194,091, filed Feb. 28, 2014 Scalability Improvement In A System Which Incrementally Updates Clients With Events That Occurred In A Cloud-Based Collaboration Platform.
U.S. Appl. No. 14/026,674, filed Sep. 13, 2013 Configurable Event-Based Automation Architecture For Cloud-Based Collaboration Platforms.
U.S. Appl. No. 61/877,917, filed Sep. 13, 2013 Systems And Methods For Configuring Event-Based Automation In Cloud-Based Collaboration Platforms.
U.S. Appl. No. 14/073,849, filed Nov. 8, 2013 Systems And Methods For Configuring Event-Based Automation In Cloud-Based Collaboration Platforms.
U.S. Appl. No. 14/027,149, filed Sep. 13, 2013 Simultaneous Editing/Accessing Of Content By Collaborator Invitation Through A Web-Based Or Mobile Application To A Cloud-Based Collaboration Platform.
U.S. Appl. No. 14/042,473, filed Sep. 30, 2013 Simultaneous Editing/Accessing Of Content By Collaborator Invitation Through A Web-Based Or Mobile Application To A Cloud-Based Collaboration Platform.
U.S. Appl. No. 14/026,837, filed Sep. 13, 2013 Mobile Device, Methods And User Interfaces Thereof In A Mobile Device Platform Featuring Multifunctional Access And Engagement In A Collaborative Environment Provided By A Cloud-Based Platform.
U.S. Appl. No. 14/166,414, filed Jan. 28, 2014 System And Method Of A Multi- Functional Managing User Interface For Accessing A Cloud-Based Platform Via Mobile Devices.
U.S. Appl. No. 14/027,147, filed Sep. 13, 2013 System And Method For Rendering Document In Web Browser Or Mobile Device Regardless Of Third-Party Plug-In Software.
U.S. Appl. No. 61/877,938, filed Sep. 13, 2013 High Availability Architecture For A Cloud-Based Concurrent-Access Collaboration Platform.
U.S. Appl. No. 14/474,507, filed Sep. 2, 2014 High Availability Architecture For A Cloud-Based Concurrent-Access Collaboration Platform.
U.S. Appl. No. 14/472,540, filed Aug. 29, 2014 Enhanced Remote Key Management For An Enterprise In A Cloud-Based Environment.
U.S. Appl. No. 14/474,008, filed Aug. 28, 2014 Configurable Metadata-Based Automation And Content Classification Architecture For Cloud-Based Collaboration Platforms.
Exam Report for GB1410569.6 Applicant: Box, Inc, dated Jul. 11, 2014, 9 pages.
Exam Report for GB1312095.1; Applicant: Box, Inc, dated Jun. 11, 2015, 9 pages.
Exam Report for GB1313559.5; Applicant: Box, Inc., dated Mar. 31, 2016, 6 pages.
Miller, "Cloud Computing Web-Based Applications That Change the Way you Work and Collaborate Online," 2009, 29 pages.
U.S. Appl. No. 13/937,101, filed Jul. 8, 2013 Identification Of People As Search Results From Key-Word Based Searches Of Content In A Cloud-Based Environment.
U.S. Appl. No. 61/709,866, filed Oct. 4, 2012 Enhanced Quick Search Features, Low-Barrier Commenting/Interactive Features In A Collaboration Platform.
U.S. Appl. No. 14/046,523, filed Oct. 4, 2013 Enhanced Quick Search Features, Low-Barrier Commenting/Interactive Features In A Collaboration Platform.

(56) References Cited

OTHER PUBLICATIONS

U.S. Appl. No. 14/531,035, filed Jul. 3, 2014 System And Method For Advanced Search And Filtering Mechanisms For Enterprise Administrators In A Cloud-Based Environment.
U.S. Appl. No. 60/992,656, filed Dec. 5, 2007 Methods and Systems for Open Source Collaboration in an Application Service Provider Environment.
U.S. Appl. No. 61/055,901, filed May 23, 2008 Methods and Systems for Open Source Integration.
U.S. Appl. No. 12/260,533 (U.S. Pat. No. 8,326,814), filed Oct. 29, 2008 (Dec. 4, 2012) Methods and Systems for Open Source Integration.
U.S. Appl. No. 13/030,090 (U.S. Pat. No. 8,140,513), filed Feb. 17, 2011 (Mar. 20, 2012) Methods and Systems for Open Source Collaboration in an Application Service Provider Environment.
U.S. Appl. No. 13/412,549, filed Mar. 5, 2012 Methods and Systems for Open Source Collaboration in an Application Service Provider Environment.
U.S. Appl. No. 13/646,339, filed Oct. 5, 2012 File Management System and Collaboration Service and Integration Capabilities With Third Party Applications.
U.S. Appl. No. 61/434,810, filed Jan. 20, 2011 Real Time Notifications of Activity and Real-Time Collaboration in a Cloud-Based Environment With Applications in Enterprise Settings.
U.S. Appl. No. 13/152,982, filed Jun. 3, 2011 Real Time Notification of Activities That Occur in a Web-Based Collaboration Environment.
U.S. Appl. No. 13/166,733, filed Jun. 22, 2011 Multimedia Content Preview Rendering in a Cloud Content Management System.
U.S. Appl. No. 61/551,894, filed Oct. 26, 2011 Enhanced Multimedia Content Preview Rendering in a Cloud Content Management System.
U.S. Appl. No. 13/590,012, filed Aug. 20, 2012 Preview Pre-Generation Based on Heuristics and Algorithmic Prediction/Assessment of Predicted User Behavior for Enhancement of User Experience.
U.S. Appl. No. 13/297,230, filed Nov. 15, 2011 Enhanced Multimedia Content Preview Rendering in a Cloud Content Management.
U.S. Appl. No. 61/592,567, filed Jan. 30, 2012 Preview Pre-Generation Based on Heuristics and Algorithmic Prediction/Assessment of Predicted User Behavior for Enhancement of User Experience.
U.S. Appl. No. 61/506,013, filed Jul. 8, 2011 Collaboration Sessions in a Workspace on a Cloud-Based Content Management System.
U.S. Appl. No. 13/208,615, filed Aug. 12, 2011 Collaboration Sessions in a Workspace on a Cloud-Based Content Management System.
U.S. Appl. No. 61/592,394, filed Jan. 30, 2012 Extended Applications of Multimedia Content Previews in the Cloud-Based Content Management System.
U.S. Appl. No. 13/588,356, filed Aug. 17, 2012 Extended Applications of Multimedia Content Previews in the Cloud-Based Content Management System.
U.S. Appl. No. 13/274,268, filed Oct. 14, 2011 Automatic and Semi-Automatic Tagging Features of Work Items in a Shared Workspace for Metadata Tracking in a Cloud-Based Content Management System With Selective or Optional User Contribution.
U.S. Appl. No. 13/968,357, filed Aug. 15, 2013 Automatic and Semi-Automatic Tagging Features of Work Items in a Shared Workspace for Metadata Tracking in a Cloud-Based Content Management System With Selective or Optional User Contribution.
U.S. Appl. No. 61/538,782, filed Sep. 23, 2011 Central Management and Control of User-Contributed Content in a Web-Based Collaboration Environment and Management Console Thereof.
U.S. Appl. No. 13/547,264, filed Jul. 12, 2012 Central Management and Control of User-Contributed Content in a Web-Based Collaboration Environment and Management Console Thereof.
U.S. Appl. No. 13/165,725, filed Jun. 21, 2011 Batch Uploading of Content to a Web-Based Collaboration Environment.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/554,450, filed Nov. 1, 2011 Platform and Application Independent Method for Document Editing and Version Tracking via a Web Browser.
U.S. Appl. No. 13/332,319, filed Dec. 20, 2011 Platform and Application Independent System and Method for Networked File Access and Editing.
U.S. Appl. No. 13/414,480, filed Mar. 7, 2012 Universal File Type Preview for Mobile Devices.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for Offline Access and Synchronization.
U.S. Appl. No. 13/689,544, filed Nov. 29, 2012 Mobile Platform File and Folder Selection Functionalities for Offline Access and Synchronization.
U.S. Appl. No. 13/345,502, filed Jan. 6, 2012 System and Method for Actionable Event Generation for Task Delegation and Management via a Discussion Forum in a Web-Based Collaboration Environment.
U.S. Appl. No. 13/619,439, filed Sep. 14, 2012 Batching Notifications of Activities That Occur in a Web-Based Collaboration Environment.
U.S. Appl. No. 61/560,685, filed Nov. 16, 2011 Temporal and Spatial Processing and Tracking of Events in a Web-Based Collaboration Environment for Asynchronous Delivery in an Ordered Fashion.
U.S. Appl. No. 13/524,501, filed Jun. 15, 2012 Resource Effective Incremental Updating of a Remote Client With Events Which Occurred via a Cloud-Enabled Platform.
U.S. Appl. No. 61/579,551, filed Dec. 22, 2011 System Status Monitoring and Data Health Checking in a Collaborative Environment.
U.S. Appl. No. 13/464,813, filed Apr. 4, 2012 Health Check Services for Web-Based Collaboration Environments.
U.S. Appl. No. 13/405,164, filed Feb. 24, 2012 System and Method for Promoting Enterprise Adoption of a Web-Based Collaboration Environment.
U.S. Appl. No. 13/431,645, filed Mar. 27, 2012 Cloud Service or Storage Use Promotion via Partnership Driven Automatic Account Upgrades.
U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/649,869, filed Mar. 21, 2012 Selective Application Access Control via a Cloud-Based Service for Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed for Text-Based Searches and/or Metadata Extraction.
U.S. Appl. No. 13/829,663, filed Mar. 14, 2013 Cloud-Based Platform Enabled With Media Content Indexed for Text-Based Searches and/or Metadata Extraction.
U.S. Appl. No. 61/702,662, filed Sep. 18, 2012 Sandboxing Individual Applications to Specific User Folders in a Cloud-Based Service.
U.S. Appl. No. 13/830,016, filed Mar. 14, 2013 Sandboxing Individual Applications to Specific User Folders in a Cloud-Based Service.
U.S. Appl. No. 61/620,568, filed Apr. 5, 2012 Synchronization Client Selective Subfolder Syncing in a Cloud-Based Environment.

(56) References Cited

OTHER PUBLICATIONS

U.S. Appl. No. 13/856,607, filed Apr. 4, 2013 Method and Apparatus for Selective Subfolder Synchronization in a Cloud-Based Environment.
U.S. Appl. No. 61/622,868, filed Apr. 11, 2012 Web and Desktop Client Synchronization of Mac Packages With a Cloud-Based Platform.
U.S. Appl. No. 13/618,993, filed Sep. 14, 2012 Cloud Service Enabled to Handle a Set of Files Depicted to a User as a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred via a Cloud-Enabled Platform.
U.S. Appl. No. 13/888,308, filed May 6, 2013 Repository Redundancy Implementation of a System Which Incrementally Updates Clients With Events That Occurred via a Cloud-Enabled Platform.
U.S. Appl. No. 61/693,521, filed Aug. 27, 2012 Backend Implementation of Synchronization Client Selective Subfolder Syncing in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/641,824, filed May 2, 2012 Platform and Application Agnostic Method for Seamless File Access in a Mobile Environment.
U.S. Appl. No. 61/650,840, filed May 23, 2012 Platform and Application Agnostic Method for Seamless File Access in a Mobile Environment.
U.S. Appl. No. 61/653,876, filed May 31, 2012 Platform and Application Agnostic Method for Seamless File Access in a Mobile Environment.
U.S. Appl. No. 13/886,147, filed May 2, 2013 System and Method for a Third-Party Application to Access Content Within a Cloud-Based Platform.
U.S. Appl. No. 13/897,421, filed May 19, 2013 Methods, Architectures and Security Mechanisms for a Third-Party Application to Access Content in a Cloud-Based Platform.
U.S. Appl. No. 13/898,200, filed May 20, 2013 Metadata Enabled Third-Party Application Access of Content at a Cloud-Based Platform via a Native Client to the Cloud-Based Platform.
U.S. Appl. No. 13/898,242, filed May 20, 2013 Identification Verification Mechanisms for a Third-Party Application to Access Content in a Cloud-Based Platform.
U.S. Appl. No. 61/667,909, filed Jul. 3, 2012 Highly Available Ftp Servers for a Cloud-Based Service.
U.S. Appl. No. 13/565,136, filed Aug. 2, 2012 Load Balancing Secure Ftp Connections Among Multiple Ftp Servers.
U.S. Appl. No. 13/649,784, filed Oct. 11, 2012 Highly Available Ftp Servers for a Cloud-Based Service.
U.S. Appl. No. 61/668,626, filed Jul. 6, 2012 Online Shard Migration.
U.S. Appl. No. 13/937,060, filed Jul. 8, 2013 System and Method for Performing Shard Migration to Support Functions of a Cloud-Based Service.
U.S. Appl. No. 61/668,698, filed Jul. 6, 2012 Identification of People as Search Results From Key-Word Based Searches of Content.
U.S. Appl. No. 61/668,791, filed Jul. 6, 2012 Systems and Methods for Specifying User and Item Identifiers Within an Email Address for Securely Submitting Comments via Email.
U.S. Appl. No. 13/937,124, filed Jul. 8, 2013 Systems and Methods for Securely Submitting Comments Among Users via External Messaging Applications in a Cloud-Based Platform.
U.S. Appl. No. 61/673,671, filed Jul. 19, 2012 Data Loss Prevention Methods and Architectures in a Cloud Service.
U.S. Appl. No. 13/944,184, filed Jul. 17, 2013 Data Loss Prevention (Dlp) Methods and Architectures by a Cloud Service.
U.S. Appl. No. 13/944,241, filed Jul. 17, 2013 Data Loss Prevention (Dlp) Methods by a Cloud Service Including Third Party Integration Architectures.
U.S. Appl. No. 61/694,492, filed Aug. 29, 2012 Method of Streaming File Encryption and Decryption to/From a Collaborative Cloud.
U.S. Appl. No. 13/975,827, filed Aug. 26, 2013 Method of Streaming File Encryption and Decryption to/From a Collaborative Cloud.
U.S. Appl. No. 61/701,823, filed Sep. 17, 2012 Use of a Status Bar Interface Element as a Handle for Revealing Additional Details.
U.S. Appl. No. 13/737,577, filed Jan. 9, 2013 System and Method of a Manipulative Handle in an Interactive Mobile User Interface.
U.S. Appl. No. 61/697,437, filed Sep. 6, 2012 Secure File Portability Between Mobile Applications Using a Server-Based Key Generation Service.
U.S. Appl. No. 13/776,358, filed Feb. 25, 2013 Secure File Portability Between Mobile Applications Using a Server-Based Key Generation Service.
U.S. Appl. No. 61/697,469, filed Sep. 6, 2012 Force Upgrade of a Mobile Application via Server Side Configuration Files.
U.S. Appl. No. 13/776,467, filed Feb. 25, 2013 Force Upgrade of a Mobile Application via Server Side Configuration File.
U.S. Appl. No. 61/697,477, filed Sep. 6, 2012 Disabling the Self-Referential Appearance of a Mobile Application in an Intent via a Background Registration.
U.S. Appl. No. 13/794,401, filed Mar. 11, 2013 Disabling the Self-Referential Appearance of a Mobile Application in an Intent via a Background Registration.
U.S. Appl. No. 61/697,511, filed Sep. 6, 2012 Channel for Opening and Editing Files From a Cloud Service Provider Based on Intents.
U.S. Appl. No. 13/776,535, filed Feb. 25, 2013 System and Method for Creating a Secure Channel for Inter-Application Communication Based on Intents.
U.S. Appl. No. 61/694,466, filed Aug. 12, 2012 Optimizations for Client and/or Server Feedback Information Enabled Real Time or Near Real Time Enhancement of Upload/Download Performance.
U.S. Appl. No. 61/702,154, filed Sep. 17, 2012 Optimizations for Client and/or Server Feedback Information Enabled Real Time or Near Real Time Enhancement of Upload/Download Performance.
U.S. Appl. No. 61/703,699, filed Sep. 20, 2012 Optimizations for Client and/or Server Feedback Information Enabled Real Time or Near Real Time Enhancement of Upload/Download Performance.
U.S. Appl. No. 13/969,474, filed Aug. 16, 2013 Client-Server Fast Upload and Download Feedback Optimizers.
U.S. Appl. No. 14/046,294, filed Oct. 4, 2013 Corporate User Discovery and Identification of Recommended Collaborators in a Cloud Platform.
U.S. Appl. No. 13/954,680, filed Jul. 30, 2013 System and Method for Advanced Control Tools for Administrators in a Cloud-Based Service.
U.S. Appl. No. 13/953,668, filed Jul. 29, 2013 System and Method for Advanced Search and Filtering Mechanisms for Enterprise Administrators in a Cloud-Based Environment.

* cited by examiner

Content Item Metadata Table — 600

| Content Item ID | Content Item Type | Collaborator Information |
|---|---|---|
| ⋮ | | |
| #57 | Text Document | User B – Upload (Owner)<br>User A – Edit<br>User C – Read<br>User D – Read |
| #58 | Spreadsheet | User B – Upload (Owner)<br>User B – Edit<br>User B – Edit<br>User A – Read |
| ⋮ | | |

*FIG. 6A*

Action Weighing 650

| Action | Weight |
|---|---|
| Upload | 10 |
| Edit/Modify | 5 |
| Read/Access | 2 |
| ⋮ | |

*FIG. 6B*

IDENTIFICATION OF PEOPLE AS SEARCH RESULTS FROM KEY-WORD BASED SEARCHES OF CONTENT IN A CLOUD-BASED ENVIRONMENT

CROSS-REFERENCE TO RELATED APPLICATION

The present application claims priority to and benefit from U.S. Provisional Patent Application Ser. No. 61/668,698 titled "IDENTIFICATION OF PEOPLE AS SEARCH RESULTS FROM KEY-WORD BASED SEARCHES OF CONTENT", filed on Jul. 6, 2012, the content of which is incorporated by reference herein.

BACKGROUND

The ever-increasing computing power and widespread use of a variety of audio/visual equipment (e.g., smart phones equipped with microphones, audio and/or video recorders, high definition signal outputs, and cameras) has made multimedia files more and more integrated in all aspects of everyday life. As such, there is a need to effectively manage, store, search, and share multimedia files in various environments including enterprise-based, individual user, or social settings.

BRIEF DESCRIPTION OF THE DRAWINGS

FIGS. 6A and 6B depict tables graphically illustrating example metadata associated with content items and action weighting, respectively.

DETAILED DESCRIPTION

Figure 1:
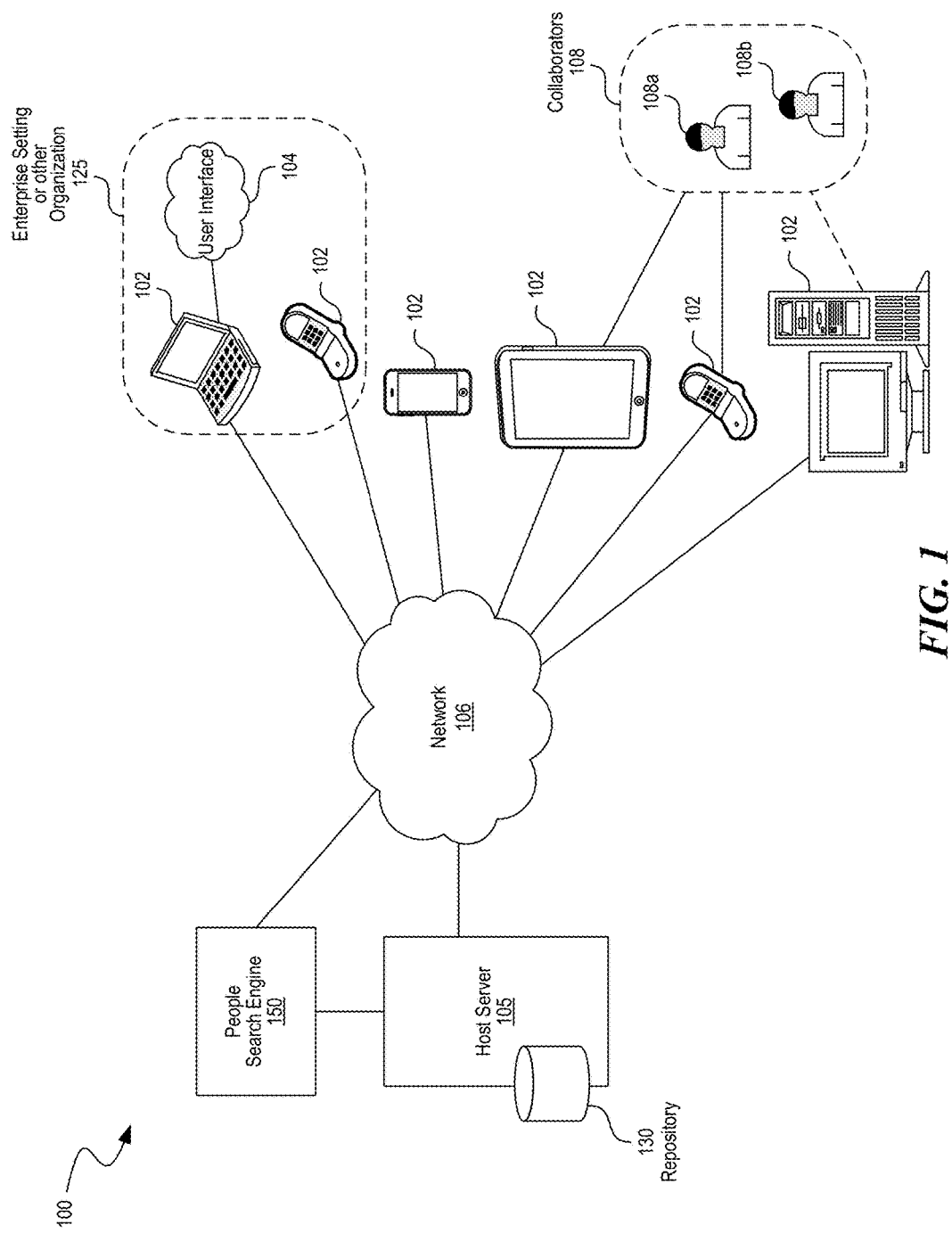
FIG. 1 illustrates an example diagram of a system having a host server of a cloud service and/or cloud storage accounts with capabilities that enable identification of users as search results responsive text-searching.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for identifying users of a system as search results responsive to a text-based content searches. By way of example, and not limitation, the examples discussed herein are primarily directed to providing collaborators as search results in a collaborative cloud-based environment. However, the techniques discussed herein are not limited to collaborative cloud-based environments and can be applied to any system utilizing a content-based search.

When searching using a text-based content search (e.g., using a set of keywords) the typical result is a set of content items (e.g., documents) relevant to the content search (or keywords). In one embodiment, the disclosed system stores metadata associated with the content that that includes user information. The user information can be used to facilitate identification of relevant individuals (user or collaborators) as search results, in addition to or in lieu of relevant content.

FIG. 1 illustrates an example diagram of a system having a host server of a cloud service and/or cloud storage accounts with capabilities that enable identification of users as search results responsive text-searching.

The client devices 102 can be any system and/or device, and/or any combination of devices/systems that is able to establish a connection, including wired, wireless, cellular connections with another device, a server and/or other systems such as host server 105 and/or people search engine 150. Client devices 102 will typically include a display and/or other output functionalities to present information and data exchanged between among the devices 102 and/or the host server 105 and/or people search engine 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 105, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
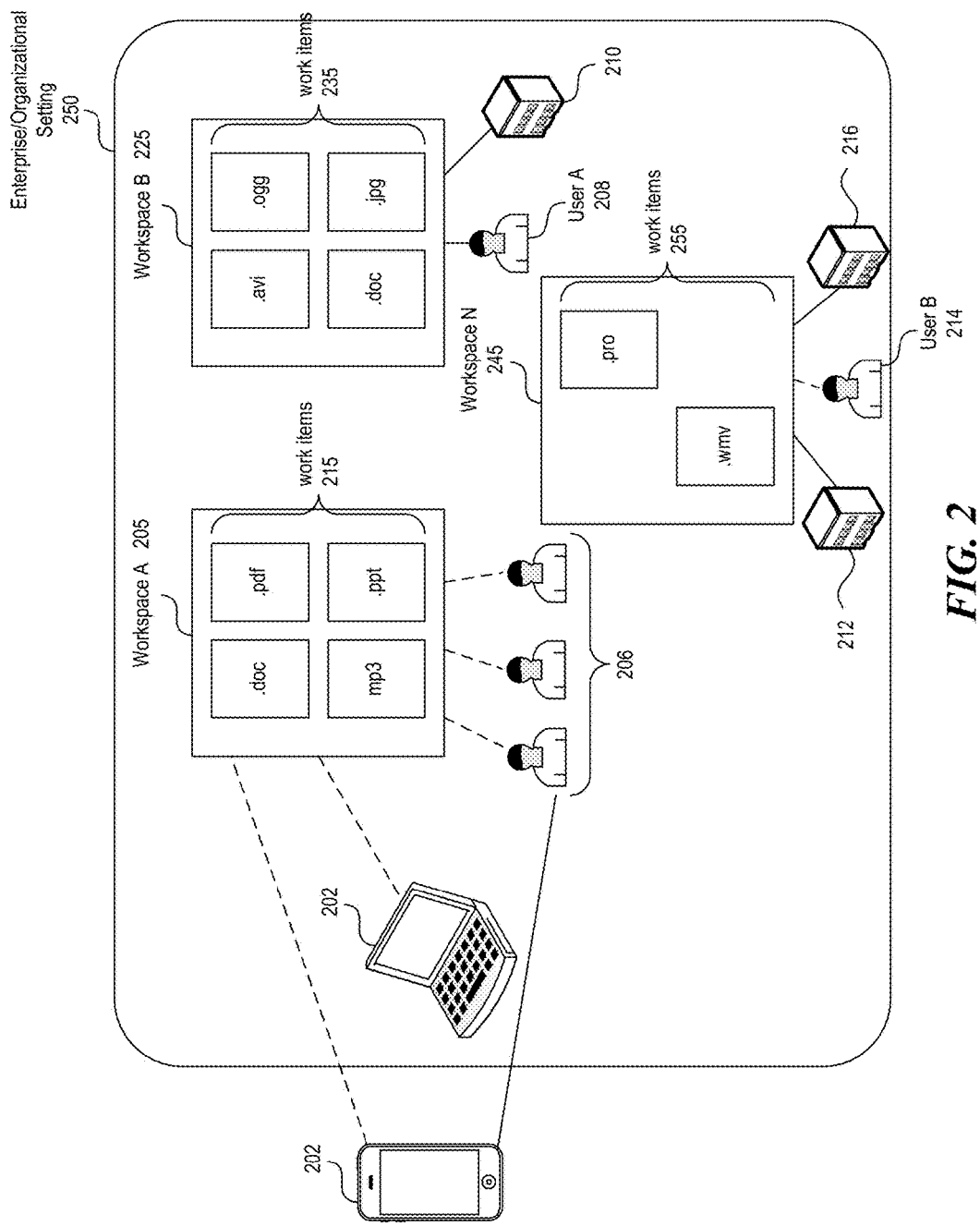
FIG. 2 depicts a diagram of a web-based or online collaboration platform deployed in an enterprise or other organizational setting for organizing work items and workspaces, as one example of a hosted cloud service and/or cloud storage accounts with capabilities that enable identification of users as search results responsive text-searching.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, client devices 102 communicate with the host server 105 and/or people search engine 150 over network 106. In general, network 106, over which the client devices 102, the host server 105, and/or people search engine 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service with capabilities that enable identification of users as search results responsive text-searching.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content (content items) downloaded or edited in accordance with the techniques described in the present disclosure can cause notifications to be generated. Such notifications can be sent to relevant users to notify them of actions surrounding a download, an edit, a change, a modification, a new file, a conflicting version, an upload of an edited or modified file.

In one embodiment, in a user interface of the web-based collaboration platform where notifications are presented, users can, via the user interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
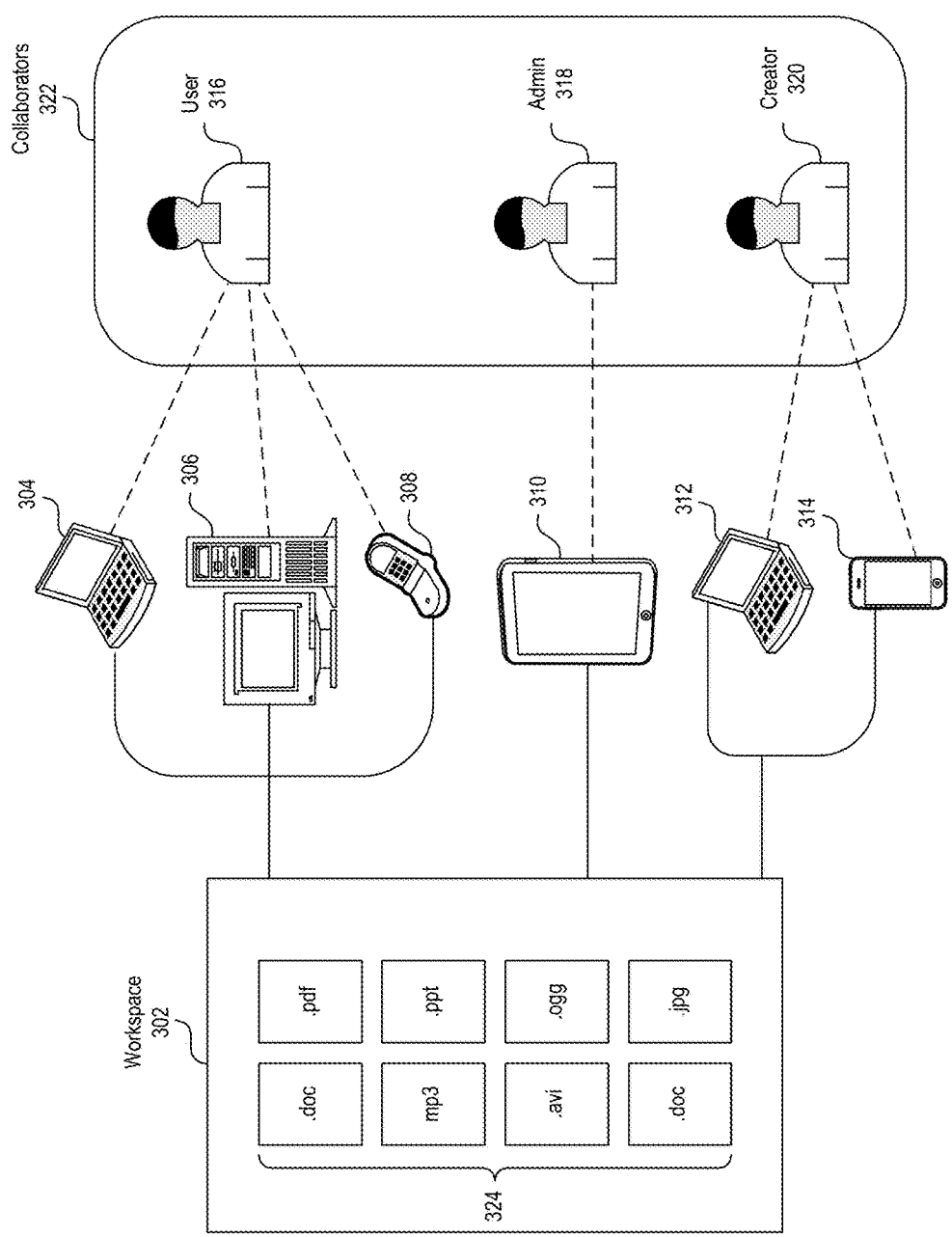
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 (e.g., content items) in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Work items hosted by a collaboration environment (e.g., a cloud-based collaboration environment) can be accessed by users (e.g., users 316, 318, and 320) via multiple different devices (e.g., devices 304-314) for viewing, editing, processing or performing other manipulations on work items. The devices can include applications for accessing a server hosting a cloud-based platform or service or other backend web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism are generally insecure, and any data passed between applications are visible to all other application on a device.

Figure 4:
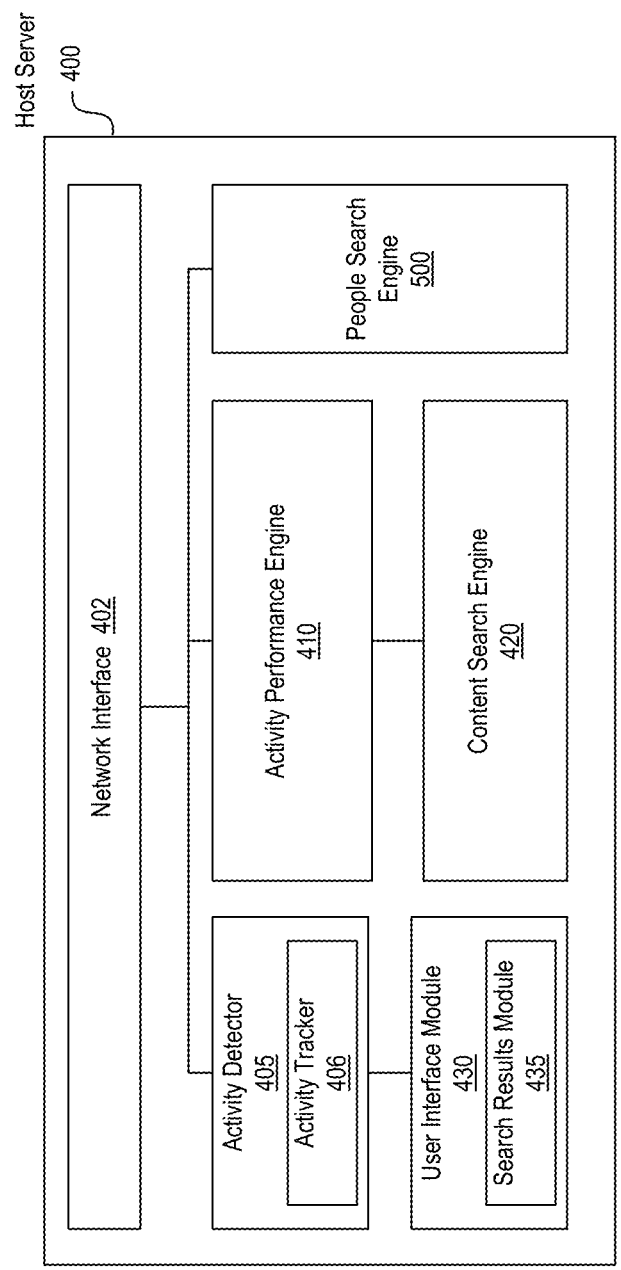
FIG. 4 depicts a block diagram illustrating an example of components in a host server for cloud-based services (e.g. collaboration or storage accounts), the host server including a people search engine facilitating identification of users as search results responsive text-searching.

FIG. 4 depicts a block diagram illustrating an example of components in a host server 400 for cloud-based services and storage accounts, the host server including a people search engine facilitating identification of users as search results responsive text-searching. The host server 400 can be host server 100 of FIG. 1 although alternative configurations are possible.

The host server 400 of the web-based or online collaboration environment can generally be a cloud-based service. The host server 400 can include, for example, a network interface 402, an activity detector 405 having an activity tracker 406, an activity performance engine 410, a content search engine 420, and a user interface module 430 having a search results module 435. The host server 400 can also include, for example, a people search engine 500. Additional or less components/modules/engines can be included in the host server 400 and each illustrated component. Further, although illustrated as included as part of the host server 400, the components/modules/engines can be physically and/or functionally distributed.

The network interface 402 can be a networking module that enables the host server 400 to mediate data in a network with an entity that is external to the host server 100, through any known and/or convenient communications protocol supported by the host and the external entity. The network interface 402 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," "a handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 400 includes the activity detector 405 which can detect an activity (or action) in the web-based collaboration environment. The detected activity can be performed by (or initiated by) a user or collaborator in a work space and can be performed on a work item or relating to a work item, for example, download or upload of the work item, previewing, commenting of a work item, deletion or editing of the work item, commenting on a work item, identifying, selecting, adding, deleting, saving, editing, and modifying a tag in the work item, setting or changing permissions of the work item, sharing the work item including, for example, emailing a link to the work item, embedding a link to the work item on another website.

The types of activities that can be detected can also relate to changes to a work space, such as adding, deleting, or modifying collaborators in the work space; changes to work items such as adding, deleting a work item in the work space; creating a discussion topic in the work space, adding a response to a discussion topic, deleting a response, or editing a response in the work space.

In one embodiment, the activity detector 405 includes an activity tracker 406 configured to track the activity performed on the work item and the corresponding user or collaborator that initiated or performed the activity on the work item. In one embodiment, the activity tracker 406 can create and/or otherwise maintain metadata for each of the content items in the web-based collaboration environment responsive to actions (activity) being performed on those content items. The metadata can include various collaborator information. For example, if a new file is uploaded by user A, the content item indicating the new file can also indicate that the new file was upload by user A. Likewise, if the new file is edited by a user B, then the activity tracker 406 can maintain the metadata such the metadata indicates the user B edited the new file. A repository (not shown) such as, for example, repository 130 of FIG. 1 can include content items uploaded to the web-based collaboration environment and associated metadata.

One embodiment of the host server 400 includes the activity performance engine 410 which can perform the activity in the cloud-based collaboration environment. For example, a user can identify the files, content, or work items to be uploaded, downloaded, accessed, edited, and/or otherwise performed by the host server 400.

One embodiment of the host server 400 includes the content search engine 420 which can perform text-based content searches of content items to identify content items relevant to a search request received from a user or collaborator in the cloud-based collaboration environment. For example, responsive to receiving a search request from a user or collaborator, the content search engine 420 can search content items uploaded to the web-based collaboration environment (e.g., content items stored in a repository (not shown) such as, for example, repository 130 of FIG. 1) to identify one or more content items that are relevant to the search request. Each of the relevant content items can be associated with metadata including collaborator information.

One embodiment of the host server 400 includes the user interface module 430, which can preserve or enhance user experience. For example, the user interface module 430 can allow the user to engage in a variety of activities in the collaboration platform including providing search results via a search results module 435. In one embodiment, the search results module 435 can provide search results to a user or collaborator of the cloud-based collaboration environment. As described herein, the search results can include users and/or collaborators of the system in addition to, or in lieu of, content One embodiment of the host server 400 includes the people search engine 500 which can facilitate identification of users as search results responsive text-searching. The people search engine 500 is discussed in greater detail with reference to FIG. 5.

Figure 5:
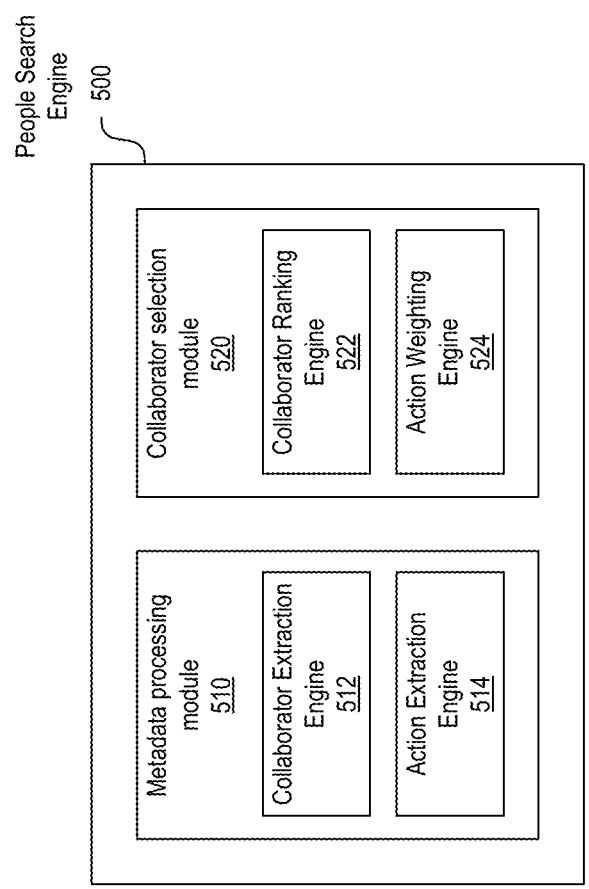
FIG. 5 depicts a block diagram illustrating an example of components in a people search engine facilitating identification of users as search results responsive text-searching.

FIG. 5 depicts a block diagram illustrating an example of components in a people search engine 500 for facilitating identification of users as search results responsive to a text-based content search. The people search engine 500 can be, for example, the people search engine 150 of FIG. 1, although alternative configurations are possible.

The people search engine 500 can include, for example, a metadata processing module 510 and a collaborator selection module 520. The metadata processing module 510 can include a collaborator extraction engine 512 and an action extraction engine 514. The collaborator selection module 520 can include a collaborator ranking engine 522 and an action weighting engine 524. Additional or less components/modules/engines can be included in people search engine 500 and each illustrated component.

One embodiment of the people search engine 500 includes the metadata processing module 510 which is configured to receive relevant content items and associated metadata including collaborator information from a content search engine such as, for example, content search engine 420 of FIG. 4. The people search engine 500 process the metadata to extract and/or parse the collaborator information using the collaborator extraction engine 512. Similarly, the people search engine 500 can process the metadata to extract and/or parse the actions associated with the particular relevant content items. An example of the content item metadata that can be associated with relevant content items is illustrated and discussed in greater detail with reference to FIG. 6A.

One embodiment of the people search engine 500 includes the collaborator selection module 520 which is configured to process the collaborator information associated with the relevant content items to select collaborators for inclusion in the search results. In one embodiment, the collaborator ranking engine 522 ranks the collaborators based on, for example, a quantity of relevant content items that are created, edited, etc., by the associated collaborator. An example of action weighting is illustrated and discussed in greater detail with reference to FIG. 6B.

FIGS. 6A and 6B depict tables 600 and 650 graphically illustrating example metadata associated with content items and example action weighting, respectively.

Referring first to FIG. 6A which illustrates a relevant content item table 600 including metadata associated with various relevant content items. The example of FIG. 6A illustrates the contents of each relevant content item, according to an embodiment. Additional or less information may be included in the metadata. Although not shown for simplicity, the metadata may be formatted in any known manner.

In the example of FIG. 6A, various columns are shown for content item ID, content item type, and collaborator information. Additional or less information can be provided. However, in this example, each content item is represented by a content item ID. The additional columns indicate metadata information associated with that content item. As discussed, the system can track collaborator information. The collaborator information can include, for example, the owner of a content item, editors of a content item, etc. As discussed herein, the collaborator information can be utilized to determine the collaborators that are relevant to a given content search. For example, as shown, content item "#57" is a text document that was uploaded by user B, edited by user A, and subsequently read or accessed by user C and user D.

Referring next to FIG. 6B which illustrates various actions associated with content items and associated weights that can be applied. Although various weights are shown in the example is of FIG. 6B, any weights can be applied to the various actions. In this example, a user that uploads a content item is given the highest weight of "10" while a user that reads/accesses a content item is given a weight of "2."

Accordingly, to identify users or collaborators that are relevant to a particular content search, the system first determines relevant content items and then processes the metadata associated with the relevant content items to identify the users or collaborators associate with the relevant content items. In one embodiment, the actions that each of the collaborators take with respect to the relevant content items can be weighted and thus used to rank the most relevant users or collaborators (e.g., those with the highest scores).

As illustrated in the example of FIG. 6B, the system a user that uploads a document might have the most knowledge about that document and thus that user would be more relevant than another user that merely edited a document. Accordingly, a higher weight can be applied to an upload action than an edit or access action.

Figure 7:
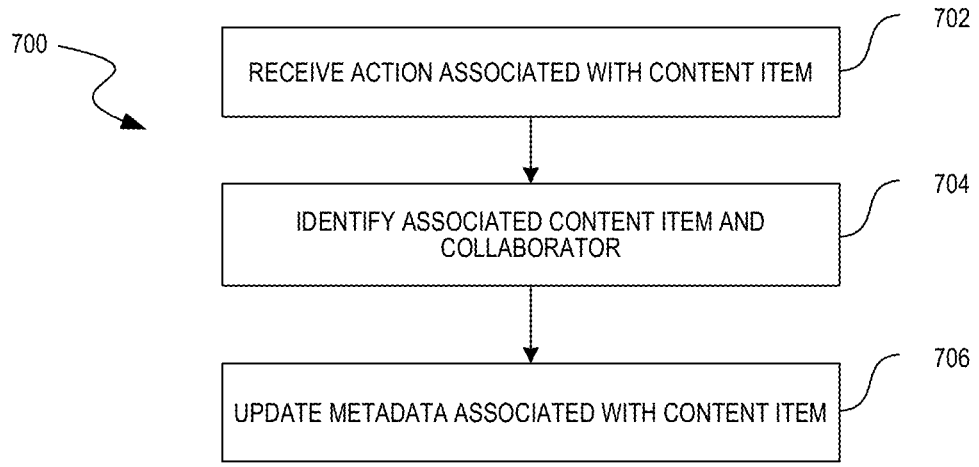
FIG. 7 depicts a flow diagram illustrating an example process for tracking actions associated with a content item and responsively updating metadata associated with the content item.

FIG. 7 depicts a flow diagram illustrating an example process 700 for tracking actions performed on content items in a cloud-based collaboration environment. Process 700 may be performed by a host server such as, for example, host server 100 of FIG. 1 or host server 400 of FIG. 4.

In process 702, the host server receives an action associated with a particular content item. For example, the host server may receive an upload request or an edit request (e.g., an action) for a particular text-based document (e.g., a content item). In process 704, the host server identifies the associated content item and a collaborator (or user) associated with the action. In one embodiment, the content item can be identifiable using a content item identifier (ID). Lastly, in process 706, the host server accesses and updates (or creates) metadata associated with the content item to indicate the user and action performed by the user.

Figure 8:
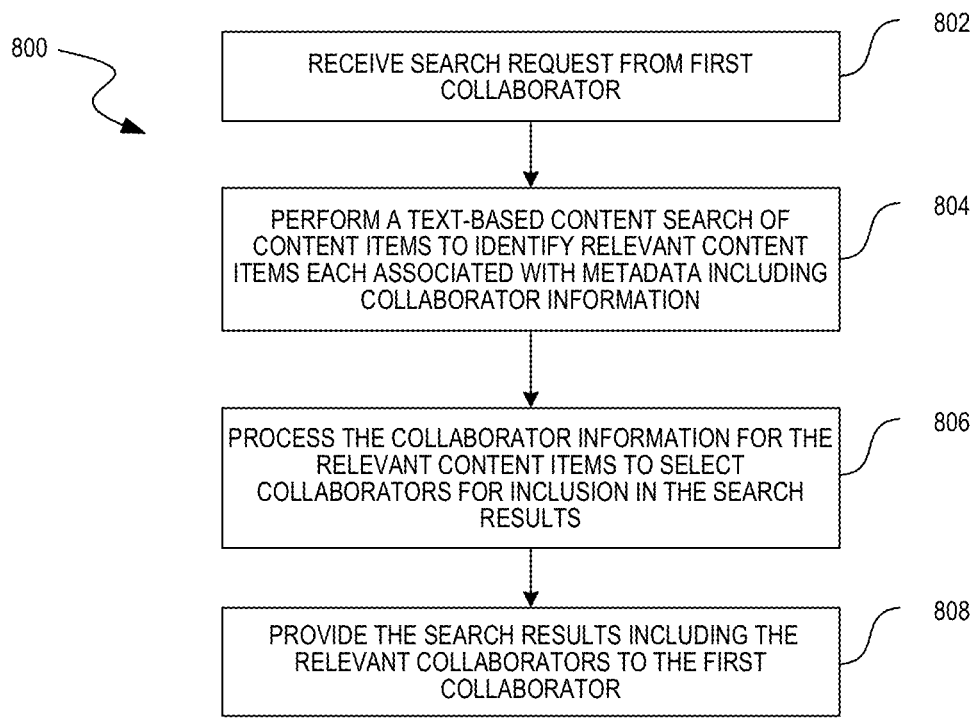
FIG. 8 depicts a flow diagram illustrating an example process for identifying and providing collaborators as search results in a collaborative cloud-based collaboration environment.

FIG. 8 depicts a flow diagram illustrating an example process 800 for identifying and providing collaborators (or users) as search results in a collaborative cloud-based collaboration environment. Process 800 may be performed by a host server such as, for example, host server 100 of FIG. 1 or host server 400 of FIG. 4.

In process 802, the host server receives a search request from a first collaborator (or user). The search request can be, for example, a text-based key word search and/or a semantics-based search. In process 804, the host server performs a text-based content search of content items to identify relevant content items, wherein each content item is associated with metadata including collaboration information. As discussed above, the host server can track actions performed on content items in the cloud-based collaboration environment and responsively update metadata associated with the content items and actions.

In process 806, the host server processes the collaborator information for the relevant content items to select relevant collaborators for inclusion in the search results. An example process for selecting the relevant collaborators for inclusion in the search results is discussed in greater detail in example process 900 of FIG. 9.

At process 808, the host server provides the search results including the relevant collaborators (users) for inclusion in the search results. In one embodiment, the host server first determines the type of search results to provide the requesting (or initiating) user (i.e., the user initiating the search request). The type of search results provided can be configurable via a user interface by each user of the collaborative cloud-based collaboration environment. For example, the user can request that the search results include only the relevant collaborators. Alternatively, the user can request that the search results include both the relevant collaborators and the relevant content items. Other search results may also be provided.

Figure 9:
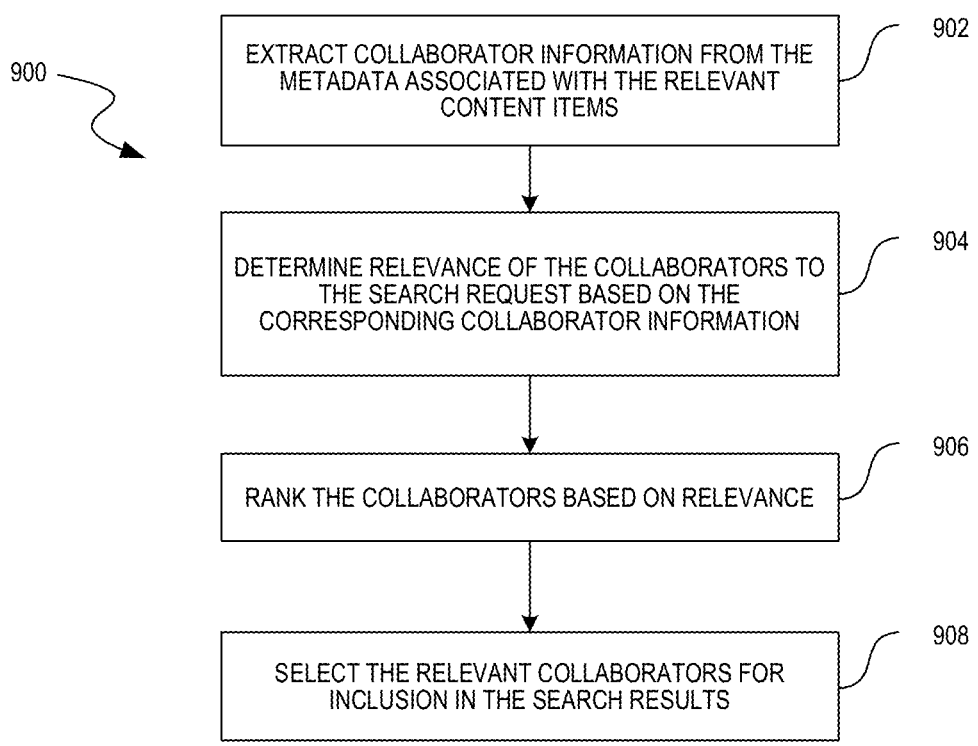
FIG. 9 depicts a flow diagram illustrating an example process for processing metadata including collaborator information associated with a content item in a collaborative cloud-based collaboration environment.

FIG. 9 depicts a flow diagram illustrating an example process 900 for processing metadata including collaborator information associated with a relevant content item in a collaborative cloud-based collaboration environment and selecting relevant collaborators for including in the search results.

In process 902, the host server extracts collaborator information from the metadata associated with the relevant content items. For example, the collaborator information can indicate collaborators and/or actions performed by collaborators within the collaborative cloud-based collaboration environment.

In process 904, the host server determines a relevance of the collaborators to the search request based on the corresponding collaborator information. In one embodiment, the relevance can be determined based on actions performed by the collaborators on the relevant content items. In one embodiment, the relevance of each of the collaborators is determined based on actions performed by the collaborators on the relevant content items. As discussed above, the system can track the actions performed on the content items in the cloud-based collaboration environment.

In one embodiment, processing the collaborator information for the relevant content items to identify the relevant collaborators further comprises applying a weight to each of the actions based on a type of action performed. By way of example, and not limitation, the actions could include create or upload a content item, edit or modify a content item, and read or access a content item.

In process 906, the host server ranks the collaborators based on relevance. For example, the host server may rank collaborators based on a quantity of the relevant content items that are created by the associated collaborator or by the highest relevant scores including weighted scores attributable to specific actions.

Lastly, in process 908, the host server selects the relevant collaborators for inclusion in the search results. For example, the host server can select the relevant collaborators for inclusion in the search results based on the relevance of the collaborators.

Figure 10:
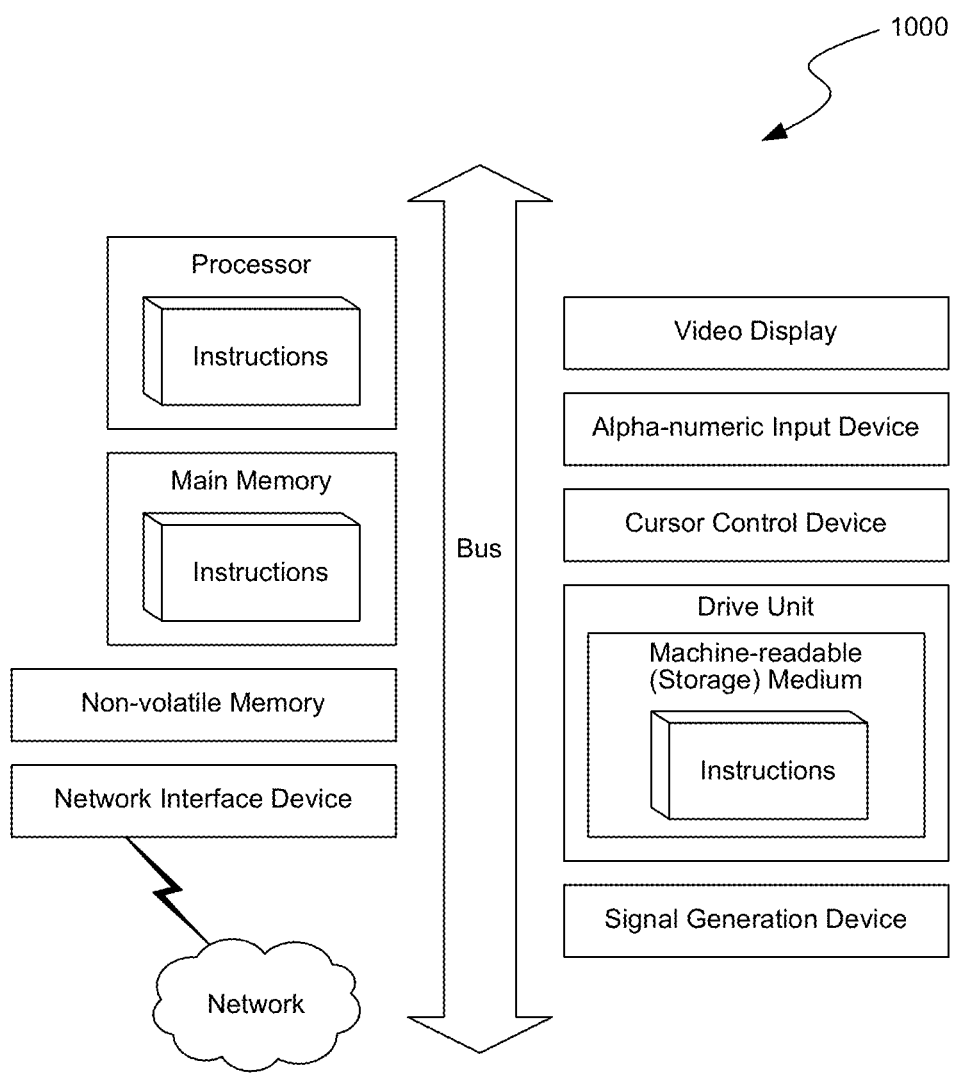
FIG. 10 depicts a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 700 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method for identifying collaborators as search results in a collaborative cloud-based collaboration environment, the method comprising:
creating metadata associated with each file of a plurality of files in the collaborative environment, the metadata identifying an action performed on the file and a collaborator of a plurality of collaborators performing the action;
applying a weight to the action performed on the file based on a type of action indicated by the metadata identifying the action, wherein the type of action comprises one of an upload action, an edit or modify action, or a read or access action;
receiving, from a first collaborator of the plurality of collaborators, a search request for a text-based keyword search on the content of the plurality of files to identify as search results file relevant to the search request;
processing the metadata associated with the relevant files based on the weight applied to each relevant file in the search results; and
providing, to the first collaborator, the search results including the relevant files and associated collaborators performing the actions on the relevant files, wherein the search results are ranked based on the processing by accumulating the weight applied to the actions performed on the relevant files.

2. The method of claim 1, wherein processing the metadata further comprises:
extracting information associated with each collaborator from the metadata associated with the relevant files; and
determining a relevance of each of the plurality of collaborators to the search request based on the corresponding collaborator information.

3. The method of claim 2, further comprising:
selecting relevant collaborators for inclusion in the search results based on the relevance of the each of the plurality of collaborators.

4. The method of claim 2, wherein the relevance of the each of the plurality of collaborators is determined based on actions performed by the each of the plurality of collaborators on the relevant files.

5. The method of claim 4, wherein applying the weight includes tracking the one or more actions performed on the plurality of files in the cloud-based collaboration environment.

6. The method of claim 4, wherein the actions include create or upload a file, edit or modify a file, and read or access a file.

7. The method of claim 2, wherein determining the relevance of the each of the plurality of the collaborators further comprises:
ranking the each of the plurality of the collaborators based on a quantity of the relevant files that are associated with the at least on collaborator.

8. The method of claim 1, wherein the content search comprises a text-based key word search.

9. The method of claim 1, wherein the content search comprises a semantics-based search.

10. The method of claim 1, wherein the search results further include the relevant files.

11. A method comprising:
accessing metadata associated with a file in a plurality of files, the metadata identifying an action performed on the file and a collaborator of a plurality of collaborators performing the action;
applying a weight to the action performed on the file based on a type of action indicated by the metadata identifying the action, wherein the type of action comprises one of an upload action, an edit or modify action, or a read or access action;
receiving, from a first collaborator of the plurality of collaborators, a search request for a text-based keyword search on the content of the plurality of files to identify as search results files relevant to the search request;
processing the metadata associated with the relevant files based on the weight applied to each relevant file in the search results; and
providing, to the first collaborator, the search results including the relevant files and associated collaborators performing the actions on the relevant files, wherein the search results are ranked based on the processing by accumulating the weight applied to the actions performed on the relevant files.

12. The method of claim 11, wherein the ranking of the search results is based on a quantity of the relevant files that are associated with the at least one collaborator.

13. The method of claim 11, wherein processing the metadata further comprises:
extracting information associated with each collaborator from the metadata associated with the relevant files;
determining a relevance of each of the plurality of collaborators to the search request based on the corresponding collaborator information; and
selecting relevant collaborators for inclusion in the search results based on the relevance of the each of the plurality of collaborators.

14. The method of claim 13, wherein the relevance of the each of the collaborators is determined based on actions performed by the each of the plurality of collaborators on the relevant files.

15. The method of claim 14, wherein applying the weight includes tracking the one or more actions performed on the plurality of files in the cloud-based system.

16. The method of claim 14, wherein the actions include create or upload a file, edit or modify a file, and read or access a file.

17. The method of claim 13, wherein determining the relevance of the each of the plurality of collaborators further comprises:
ranking the each of the plurality of collaborators based on a quantity of the relevant files that are associated with the at least one collaborator.

18. The method of claim 11, wherein the content search comprises one or more of:
a text-based key word search or a semantics-based search.

19. The method of claim 11, wherein the search results further include the relevant files.

20. An apparatus comprising:
a processor;
a memory unit having instructions stored thereon which when executed by the processor, causes the collaboration system to:
update metadata associated with a file in a plurality of files, in response to detecting an action performed on the file by a collaborator of a plurality of collaborators, the metadata identifying an action performed on the file and a collaborator of the plurality of collaborators performing the action;
receive, from a first collaborator of the plurality of collaborators, a search request for a text-based content search of the plurality of files to identify files relevant to the search request;
process the metadata associated with the relevant files based on the weight applied to each relevant file in the search results; and
provide, to the first collaborator, the search results including the relevant files and associated collaborators performing the actions on the relevant files, wherein the search results are ranked based on the processing by accumulating the weight applied to the actions performed on the relevant files.

21. The apparatus of claim 20, wherein the instructions, when executed by the processor, further causes the collaboration system to:
 track the one or more actions performed on the plurality of files in the cloud-based collaboration environment.

22. The apparatus of claim 20, wherein processing the metadata further compromises:
 extracting information associated with each collaborator from the metadata associated with the relevant files; and
 determining a collaborator relevance of the each of the collaborators to the search request based on the corresponding collaborator information.

23. A machine-readable storage medium including executable instructions, which when executed by a processor, causes the processor to:
 create metadata associated with each in of a plurality of files in the collaborative environment, the metadata identifying an action performed on the file and a collaborator of a plurality of collaborators performing the action;
 apply a weight to the action performed on the file based on a type of action indicated by the metadata identifying the action, wherein the type of action comprises one of an upload action, an edit or modify action, or a read or access action;
 receive, from a first collaborator of the plurality of collaborators, a search request for a text-based keyword search on the content of the plurality of files to identify as search results files relevant to the search request;
 process the metadata associated with the relevant files based on the weight applied to each relevant file in the search results; and
 provide, to the first collaborator, the search results including the relevant files and associated collaborators performing the actions on the relevant files, wherein the search results are ranked based on the processing by accumulating the weight applied to the actions performed on the relevant files.

* * * * *